US011240036B2

(12) United States Patent
Yang (10) Patent No.: US 11,240,036 B2
(45) Date of Patent: *Feb. 1, 2022

(54) CONSENSUS VERIFICATION METHOD, APPARATUS, AND DEVICE

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,278

(22) Filed: Mar. 19, 2021

(65) Prior Publication Data

US 2021/0211295 A1 Jul. 8, 2021

Related U.S. Application Data

(63) Continuation of application No. 16/295,771, filed on Mar. 7, 2019, now Pat. No. 10,985,923.

(30) Foreign Application Priority Data

Mar. 9, 2018 (CN) .......................... 201810196464.2

(51) Int. Cl.
*H04L 9/32* (2006.01)
*H04L 9/06* (2006.01)
(Continued)

(52) U.S. Cl.
CPC .......... *H04L 9/3239* (2013.01); *G06Q 20/401* (2013.01); *G06Q 20/403* (2013.01); (Continued)

(58) Field of Classification Search
CPC ..... H04L 9/32–3297; H04L 9/06–0643; H04L 67/1042; H04L 2209/38; H04L 2209/56; G06Q 20/401; G06Q 20/403
See application file for complete search history.

(56) References Cited

U.S. PATENT DOCUMENTS

| 10,887,108 | B2 | 1/2021 | Yang |
| 2017/0024818 | A1 | 1/2017 | Wager et al. |

(Continued)

FOREIGN PATENT DOCUMENTS

| CN | 106327173 | 1/2017 |
| CN | 106603698 | 4/2017 |

(Continued)

OTHER PUBLICATIONS

K. Saito and H. Yamada, "What's So Different about Blockchain?—Blockchain is a Probabilistic State Machine," 2016 IEEE 36th International Conference on Distributed Computing Systems Workshops (ICDCSW), 2016, pp. 168-175, doi: 10.1109/ICDCSW.2016.28. (Year: 2016).*

(Continued)

*Primary Examiner* — Madhuri R Herzog
(74) *Attorney, Agent, or Firm* — Fish & Richardson P.C.

(57) ABSTRACT

Implementations of the present specification disclose a consensus verification method, apparatus, and device. In the implementations of the present specification, for each piece of service data, if first consensus verification on the service data fails, a first node determines whether the service data satisfies a predetermined retry condition instead of directly considering the service data to be invalid. If the predetermined retry condition is satisfied, then the service data is stored as service data to be retried. The first node can perform the first consensus verification on the service data to be retried in response to determining that a predetermined retry execution condition is triggered.

20 Claims, 7 Drawing Sheets

(51) Int. Cl.
   *H04L 29/08* (2006.01)
   *G06Q 20/40* (2012.01)
(52) U.S. Cl.
   CPC ........ *H04L 9/0618* (2013.01); *H04L 67/1042* (2013.01); *H04L 2209/38* (2013.01); *H04L 2209/56* (2013.01)

(56) References Cited

U.S. PATENT DOCUMENTS

| | | | |
|---|---|---|---|
| 2017/0317834 A1 | 11/2017 | Smith et al. | |
| 2017/0344987 A1 | 11/2017 | Davis | |
| 2019/0164220 A1* | 5/2019 | Raj | G06Q 40/04 |
| 2019/0190719 A1 | 6/2019 | van de Ruit | |
| 2019/0280873 A1 | 9/2019 | Yang | |
| 2020/0136830 A1 | 4/2020 | Yang | |

FOREIGN PATENT DOCUMENTS

| | | |
|---|---|---|
| CN | 106845210 | 6/2017 |
| CN | 107194008 | 9/2017 |
| CN | 107196900 | 9/2017 |
| CN | 107368507 | 11/2017 |
| CN | 107392611 | 11/2017 |
| CN | 107395353 | 11/2017 |
| CN | 107395659 | 11/2017 |
| WO | WO 2017182788 | 10/2017 |
| WO | 2018020372 A1 | 2/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Du et al., "A Review on Consensus Algorithm of Blockchain", IEEE International Conference on Systems, Man and Cybernetics, Oct. 2017, 6 pages.

Duffield et al., "Transaction locking and masternode consensus: A mechanism for mitigating double spending attacks", Cryptopapers, 2014, 14 pages.

Google [online], "Hyperledger Whitepaper," Feb. 2016, [retrieved on Feb. 6, 2017], retrieved from: URL<http://blockchainlab.com/pdf/Hyperledger%20Whitepaper.pdf>, 20 pages.

Hyperledger [online], "Transaction Flow—hyperledger-fabridocs master documentation," available on or before Aug. 4, 2017, via Internet Archive: Wayback Machine URL <https://web.archive.org/web/20170804103334/http://hyperledger-fabric-docs.readthedocs.io:80/en/latest/txflow.html>, [retrieved on Jan. 23, 2019], retrieved from: URL<http://hyperledger-fabric-docs.readthedocs.io/en/latest/txflow.html>, 3 pages.

International Preliminary Report on Patentability in International Application No. PCT/US2019/020830, dated Sep. 15, 9 pages.

International Search Report and Written Opinion in International Application No. PCT/US2019/020830, dated May 22, 2019, 16 pages.

Li et al., "Proof of Vote: A High-Performance Consensus Protocol Based on Vote Mechanism & Consortium Blockchain,", IEEE 19th International Conference on High Performance Computing and Communications; IEEE 15th International Conference on Smart City, 466-473, 2017.

Nakamoto, "Bitcoin: A Peer-to-Peer Electronic Cash System," www.bitcoin.org, 2005, 9 pages.

Peters et al., "Understanding Modern Banking Ledgers Through Blockchain Technologies: Future of Transaction Processing and Smart Contracts on the Internet of Money", Banking Beyond Banks and Money, 2016, pp. 239-278.

Read The Docs [Online], "Architecture Origins," 2019, [retrieved on Aug. 14, 2019], retrieved from: URL<https://hyperledger-fabric.readthedocs.io/en/release-1.4/arch-deep-dive.html>, 10 pages.

S.P., Manoj, IBM [online], "Hyperledger & Smart Contracts," 2-3. Introduction to Hyper-ledger Fabric & Exploring Blockchain Application & Docker Containers, Dec. 2015, [retrieved on Feb. 6, 2017], retrieved from: URL<https://www-01.ibm.com/events/wwe/grp/grp307.nsf/vLookupPDFs>, 40 pages.

Sousa et al., "A Byzantine Fault-Tolerant Ordering Service for the Hyperledger Fabric Blockchain Platform," Cornell University Library, Ithaca, NY, Sep. 2017, 10 pages.

\* cited by examiner

CONSENSUS VERIFICATION METHOD, APPARATUS, AND DEVICE

CROSS-REFERENCE TO RELATED APPLICATIONS

This application is a continuation of U.S. patent application Ser. No. 16/295,771, filed Mar. 7, 2019, which claims priority to Chinese Patent Application No. 201810196464.2, filed on Mar. 9, 2018, which is hereby incorporated by reference in its entirety.

TECHNICAL FIELD

The present specification relates to the field of information technologies, and in particular, to a consensus verification method, apparatus, and device.

BACKGROUND

Currently, many blockchain systems developed based on blockchain technologies have a wide application prospect. Some widely known blockchain systems include the bitcoin, the Ethereum, the Hyperledger, etc., and each blockchain system has different architectures.

Figure 1:
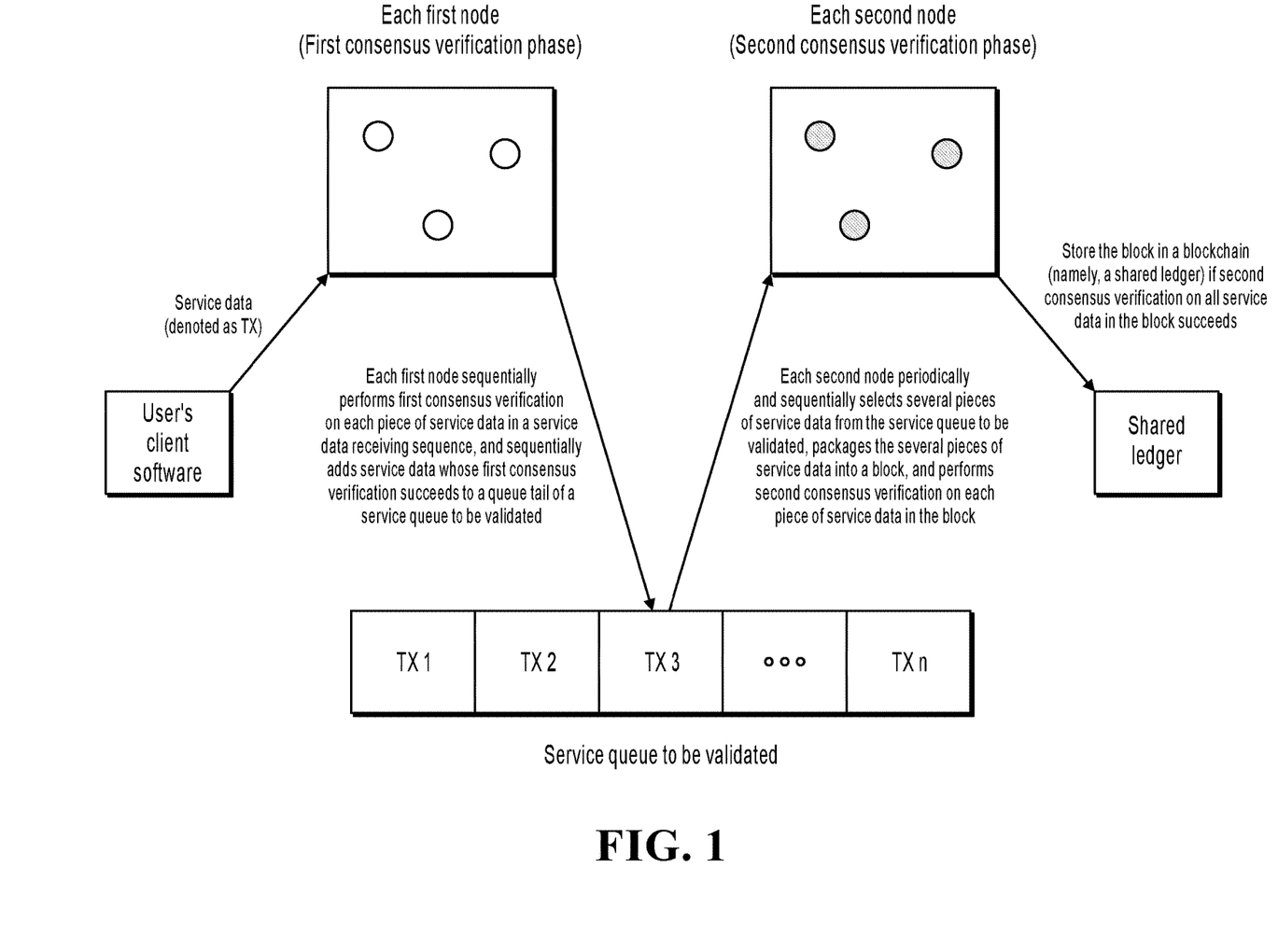
FIG. 1 is an architectural diagram illustrating an existing blockchain system, according to an implementation of the present specification.

For the Hyperledger or other blockchain systems whose architectures are similar to the Hyperledger, a general architecture is shown in FIG. 1. In a blockchain system shown in FIG. 1, a consensus verification process of a service is divided into two phases: a first consensus verification phase and a second consensus verification phase (in the Hyperledger system, the first consensus verification phase is referred to as an endorsement phase, and the second consensus verification phase is referred to as a validation phase). Types of blockchain nodes can include at least a first node (a hollow node in FIG. 1) and a second node (a solid node in FIG. 1). A blockchain node can serve as both a first node and a second node (in the Hyperledger system, the first node is referred to as an endorsement node, and the second node is referred to as a validation node).

Referring back to FIG. 1, each first node receives service data sent by a user by using client software, and sequentially performs first consensus verification on each piece of service data in a service data receiving sequence. Service data whose first consensus verification succeeds is sequentially added to a queue tail of a service queue to be validated (for service data TX n, a smaller value of n indicates an earlier time for the service data to be received by each first node). All blockchain nodes store the service queue to be validated, and synchronously update the service queue to be validated. Each second node can periodically and sequentially select several pieces of service data in a front-to-back order from the service queue to be validated, package the several pieces of service data into a block, and perform second consensus verification on the service data in the block. A block including service data that all pass the second consensus verification is stored by each second node in a blockchain (namely, a shared ledger). It is worthwhile to note that, for each piece of service data in the service queue to be validated, all the blockchain nodes delete the service data from the service queue to be validated if the service data is selected.

The first consensus verification means that each first node verifies validity of the service data based on a consensus algorithm. Each first node sequentially simulates a service operation corresponding to each piece of received service data to obtain a service simulation result, determines whether the service data is reasonable based on the service simulation result, and if yes, determines that first consensus verification on the service data succeeds; otherwise, determines that first consensus verification on the service data fails. The second consensus verification mainly is verification on aspects other than the validity of the service data based on the consensus algorithm, for example, verifying whether there are repeated expenses (in other words, one asset is spent more than once).

Based on the existing technology, a more convenient consensus verification method is needed for users.

SUMMARY

Implementations of the present specification provide a consensus verification method, apparatus, and device, to alleviate a problem that an existing consensus verification method is inconvenient for a user.

To alleviate the previous technical problem, the implementations of the present specification are implemented as follows.

According to a consensus verification method provided in an implementation of the present specification, blockchain nodes include at least a first node and a second node, the first node is configured to perform first consensus verification, the second node is configured to perform second consensus verification, and the method includes: receiving, by the first node, service data, and performing the first consensus verification on the service data; adding the service data to a service queue to be validated if the first consensus verification on the service data succeeds, so that each second node selects service data from the service queue to be validated to generate a block, and performs the second consensus verification on the block; or if the first consensus verification on the service data fails, determining whether the service data satisfies a predetermined retry condition, if yes, storing the service data as service data to be retried; and performing the first consensus verification on the service data to be retried when it is determined that a predetermined retry execution condition is triggered.

According to a consensus verification apparatus provided in an implementation of the present specification, blockchain nodes include at least the apparatus and a second node, the apparatus is configured to perform first consensus verification, the second node is configured to perform second consensus verification, and the apparatus includes: a verification module, configured to receive service data, perform the first consensus verification on the service data, and perform the first consensus verification on service data to be retried when it is determined that a predetermined retry execution condition is triggered; an adding module, configured to add the service data to a service queue to be validated if the first consensus verification on the service data succeeds, so that each second node selects service data from the service queue to be validated to generate a block, and performs the second consensus verification on the block; and a determining and storage module, configured to: if the first consensus verification on the service data fails, determine whether the service data satisfies a predetermined retry condition, and if yes, store the service data as the service data to be retried.

According to a consensus verification device provided in an implementation of the present specification, blockchain nodes include at least the device and a second node, the device is configured to perform first consensus verification, and the second node is configured to perform second consensus verification. The device includes one or more processors and a memory, the memory stores a program, and the one or more processors are configured to perform the following steps: receiving service data, and performing the first consensus verification on the service data; adding the service data to a service queue to be validated if the first consensus verification on the service data succeeds, so that each second node selects service data from the service queue to be validated to generate a block, and performs the second consensus verification on the block; or if the first consensus verification on the service data fails, determining whether the service data satisfies a predetermined retry condition, and if yes, storing the service data as service data to be retried; and performing the first consensus verification on the service data to be retried when it is determined that a predetermined retry execution condition is triggered.

It can be seen from the previous technical solutions provided in the implementations of the present specification that, in the implementations of the present specification, for each piece of service data, if first consensus verification on the service data fails, the first node determines whether the service data satisfies the predetermined retry condition instead of directly considering the service data to be invalid and discarding the service data, and if yes, stores the service data as service data to be retried. The first node can perform the first consensus verification on the service data to be retried when determining that the predetermined retry execution condition is triggered. In such case, service data whose first consensus verification fails at the first time can later enter a first consensus verification phase again if the service data satisfies the predetermined retry condition. Although first consensus verification on service data fails at the first time due to some reasons (for example, an asset balance of the user is insufficient), the reasons why the first consensus verification on the service data fails may be eliminated over time. In such case, the first consensus verification on the service data can succeed if the first node can perform the first consensus verification on the service data, and the user does not need to resend the same service data to the first node. This is convenient for users.

BRIEF DESCRIPTION OF DRAWINGS

To describe technical solutions in implementations of the present specification or in the existing technology more clearly, the following briefly describes the accompanying drawings required for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

In an existing consensus verification method, to flexibly deploy blockchain nodes, types of the blockchain nodes are classified into a first node and a second node (also referred to as an endorsement node and a validation node) in the Hyperledger or another architecture similar to the Hyperledger. Each first node sequentially performs first consensus verification on each piece of service data in a service data receiving sequence, and sequentially adds service data whose first consensus verification succeeds to a queue tail of a service queue to be validated, and each second node usually sequentially selects several pieces of service data in a front-to-back order from the service queue to be validated, and performs second consensus verification on the several pieces of service data. Because of the previous sequence, validity of service data is based on service data whose first consensus verification succeeds before the service data, instead of service data whose first consensus verification succeeds after the service data. In practice, a reason (for example, an asset balance of a user is insufficient, or a user temporarily has no service authority) why first consensus verification on service data fails can be temporary, and can be eliminated over time. However, when the reason that leads to the first consensus verification on the service data failure is eliminated, the user can achieve a corresponding service objective only by resending the same service data to each first node. This is inconvenient for the user.

Figure 2:
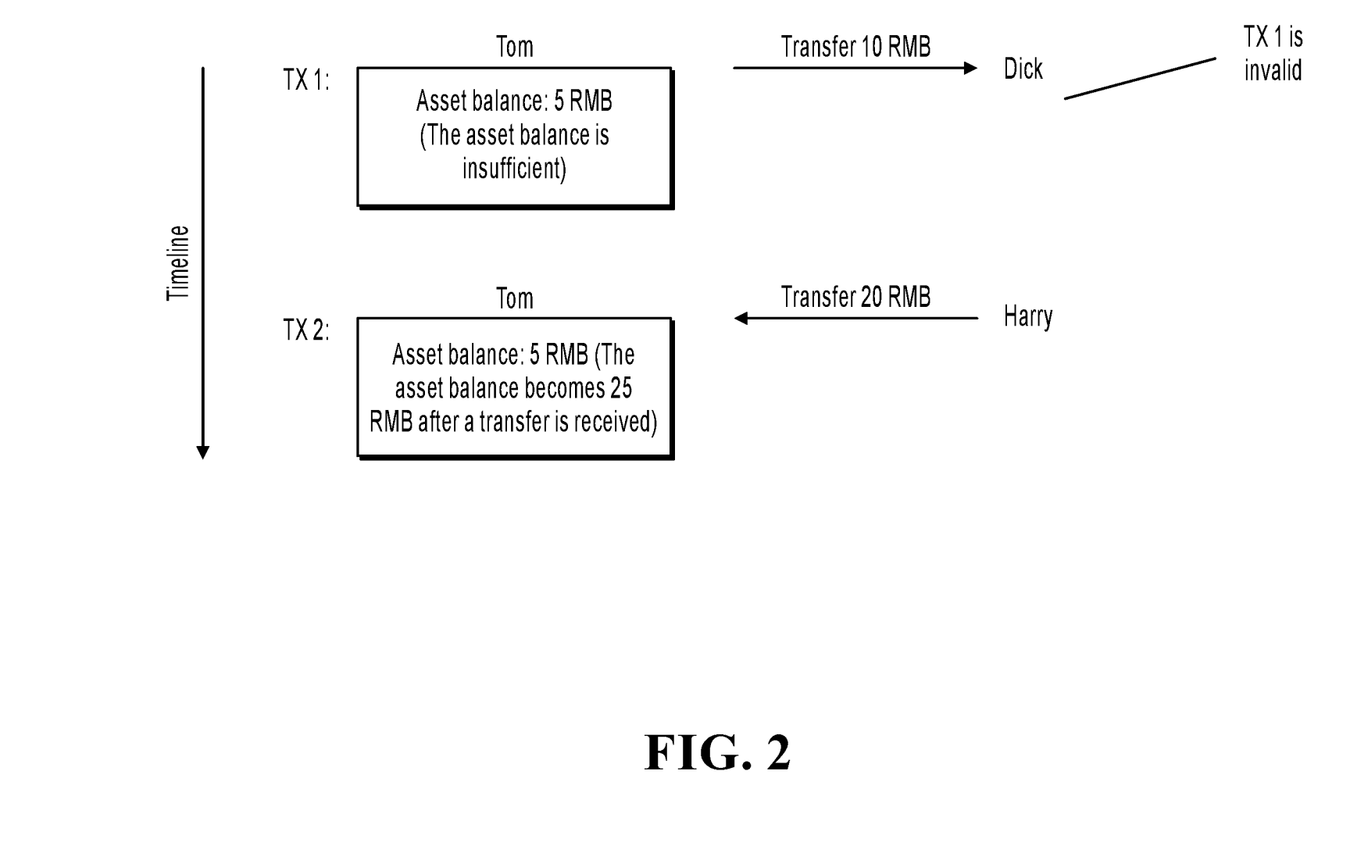
FIG. 2 is a schematic diagram illustrating a problem in an existing consensus verification method.

For example, as shown in FIG. 2, the service data is denoted as TX. Assume that a current asset balance of user Tom is 5 RMB and Tom wants to transfer 10 RMB to user Dick. Tom sends TX 1 to each first node by using client software, and each first node performs first consensus verification on the service data, to be specific, simulates a transfer of 10 RMB from Tom to Dick. An obtained service simulation result is that the asset balance of Tom becomes −5 RMB, which is unreasonable. Therefore, each first node determines that first consensus verification on TX 1 fails, and refuses to add TX 1 to the service queue to be validated. Consequently, the transfer transaction initiated by Tom cannot enter a second consensus verification phase, and cannot be recorded in a shared ledger, and therefore the transaction is invalid.

For TX 2 (Harry transfers 20 RMB to Tom) that enters a first consensus verification phase after TX 1, when first consensus verification and second consensus verification on TX 2 succeed and TX 2 is stored in a blockchain, the asset balance of Tom reaches 25 RMB. In such case, a reason why the first consensus verification on TX 1 fails before is eliminated. However, TX 1 previously sent by Tom to each first node is considered to be invalid and is discarded. Therefore, Tom can only achieve a service objective of transferring 10 RMB to Dick by resending TX 1 to each first node.

However, in the implementations of the present specification, if service data whose first consensus verification fails satisfies a predetermined retry condition, the service data is not directly considered to be invalid, but becomes service data to be retried. Each first node performs first consensus verification on the service data to be retried when a predetermined retry execution condition is triggered. In such case, still use the previous example, TX 1 whose first consensus verification fails at the first time becomes service data to be retried. When the retry execution condition is triggered, new first consensus verification on TX 1 can succeed if TX 2 is confirmed to be valid, so TX 1 can successfully enter the service queue to be validated (and can later enter the second consensus verification phase). Therefore, the user does not need to resend TX 1 to the first node. This is convenient for the user.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all implementations of the present specification. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

Figure 3:
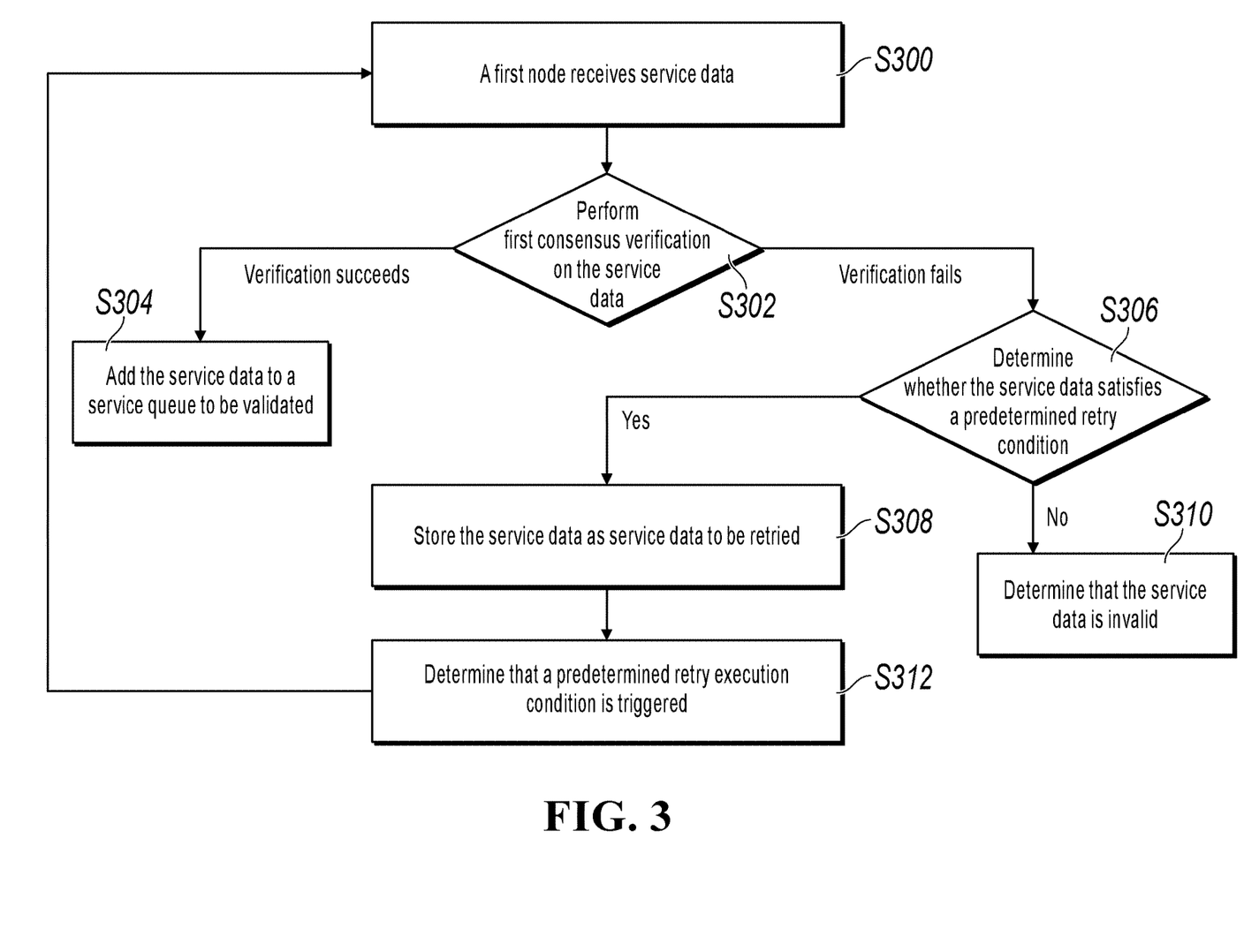
FIG. 3 is a flowchart illustrating a consensus verification method, according to an implementation of the present specification.

FIG. 3 is a flowchart illustrating a consensus verification method, according to an implementation of the present specification. The following steps are included.

S300: A first node receives service data.

In the present implementation of the present specification, a blockchain system is based on the "Hyperledger" or another architecture similar to the "Hyperledger". In the blockchain system, a consensus verification process is divided into a first consensus verification phase and a second consensus verification phase. A blockchain node that forms the blockchain system can be a device that has a communication function and a data processing function. There are at least two types of blockchain nodes: the first node and a second node. The first node is configured to perform first consensus verification, and the second node is configured to perform second consensus verification. A blockchain node can serve as both a first node and a second node.

It is well known that a plurality of blockchain nodes need to participate in consensus verification. A plurality of first nodes complete the first consensus verification together. However, for ease of description, a step performed by only one first node is mainly described below, and all first nodes perform the same step. "The first node performs consensus verification" below actually means that "the first node performs consensus verification together with the other first nodes".

In actual applications, if a user wants to initiate a service, the user needs to send service data of the service to the first node by using client software. For example, if user A wants to initiate a transfer service (a transfer to user B), the transferor user A needs to send, to each first node by using the client software, a payee address, a transfer amount, etc. that are related to the transfer service, and uses the payee address, the transfer amount, etc. as service data.

S302: Perform first consensus verification on the service data, and perform step S304 if the first consensus verification on the service data succeeds; or perform step S306 if the first consensus verification on the service data fails.

In the present implementation of the present specification, the first node performs the first consensus verification on the service data after receiving the service data. For description of the first consensus verification, references can be made to the previous description. Details are omitted here for simplicity.

S304: Add the service data to a service queue to be validated.

The first node adds the service data to the service queue to be validated if the first consensus verification on the service data succeeds in step S302. The service queue to be validated can be precreated by the first node in a memory of the first node or another storage medium.

S306: Determine whether the service data satisfies a predetermined retry condition, and if yes, perform step S308, or otherwise, perform step S310.

If the first consensus verification on the service data fails in step S302, the first node further determines whether the service data can be retried. The retry condition can be predetermined based on actual needs.

Whether the service data satisfies the predetermined retry condition can be determined based on a reason why the first consensus verification on the service data fails. To be specific, the service data satisfies the predetermined retry condition if the reason that the first consensus verification on the service data fails can be eliminated over time.

For example, when the service data is the service data of the transfer service, if the first consensus verification on the service data fails, the first node can determine that the service data satisfies the predetermined retry condition when determining that an asset balance of the transferor is insufficient (in other words, the reason why the first consensus verification on the service data fails is that the asset balance of the transferor is insufficient). It is worthwhile to note that an asset in the present implementation of the present application is not limited to a currency, and can be other property such as minerals and artworks.

For another example, the first node can determine that the service data satisfies the predetermined retry condition when determining that a user involved in the service data lacks specified service authority (in other words, the reason why the first consensus verification on the service data fails is that the user involved in the service data lacks specified service authority).

S308: Store the service data as service data to be retried.

In the present implementation of the present specification, the first node can store, as service data to be retried, service data whose first consensus verification fails and that satisfies the predetermined retry condition. The first node can store the service data to be retried in the memory or another storage medium.

S310: Determine that the service data is invalid.

In the present implementation of the present specification, the first node can directly determine, as invalid service data, service data whose first consensus verification fails and that does not satisfy the predetermined retry condition.

S312: Perform the first consensus verification on the service data to be retried when it is determined that a predetermined retry execution condition is triggered.

In the present implementation of the present specification, the retry execution condition can be predetermined based on a need. If a maximum capacity (for example, 10 trillion) of each block is predetermined, and/or the second node generates a period (for example, 10 seconds) of each block in the blockchain system is determined, it is determined that the predetermined retry execution condition is triggered, including the following:

It is determined that the predetermined retry execution condition is triggered if a difference between the maximum capacity and a total data amount of service data selected by each second node from the service queue to be validated to generate a next block falls within a first specified value range; and/or it is determined that the predetermined retry execution condition is triggered if a time interval between a current moment and an end moment of a current period falls within a second specified value range. The first specified value range and the second specified value range can be specified based on a need.

In the present implementation of the present specification, for each piece of service data to be retried, if a reason why first consensus verification on the service data to be retried fails before is eliminated before the first node performs the first consensus verification on the service data to be retried, the first consensus verification on the service data to be retried can succeed when the first node performs the first consensus verification on the service data to be retried. If a reason why first consensus verification on the service data to be retried fails before is still not eliminated before the first node performs the first consensus verification on the service data to be retried, the first consensus verification on the service data to be retried will still fails when the first node performs the first consensus verification on the service data to be retried.

In step S312, the first node can perform the first consensus verification on the service data to be retried, until the first consensus verification on the service data to be retried succeeds, or until the number of times of performing the first consensus verification on the service data to be retried reaches a specified value.

According to the consensus verification method shown in FIG. 3, for each piece of service data, if first consensus verification on the service data fails, the first node determines whether the service data satisfies the predetermined retry condition instead of directly considering the service data to be invalid, and if yes, stores the service data as service data to be retried. The first node can perform the first consensus verification on the service data to be retried when determining that the predetermined retry execution condition is triggered. In such case, service data whose first consensus verification fails at the first time can later enter the first consensus verification phase again if the service data satisfies the predetermined retry condition. Although first consensus verification on service data fails at the first time due to some reasons (for example, an asset balance of the user is insufficient), the reasons why the first consensus verification on the service data fails may be eliminated over time. In such case, the first consensus verification on the service data can succeed if the first node can perform the first consensus verification on the service data, and the user does not need to resend the same service data to the first node. This is convenient for the user.

Figure 4:
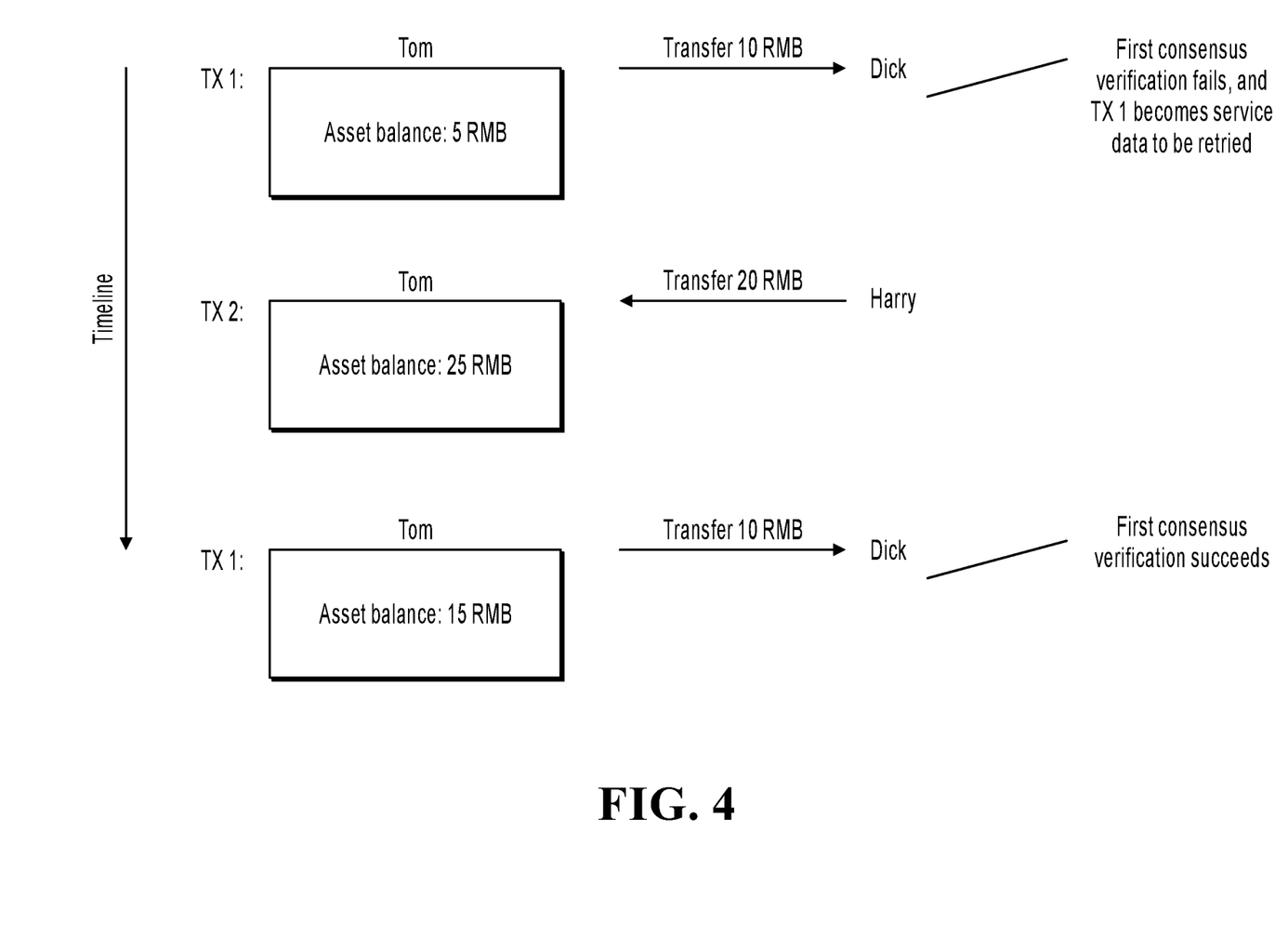
FIG. 4 is a schematic diagram illustrating a technical effect, according to an implementation of the present specification.

FIG. 4 is a schematic diagram illustrating a technical effect, according to an implementation of the present specification. As shown in FIG. 4, each first node performs first consensus verification on TX 1 after Tom sends TX 1 to the first node, and the first consensus verification on TX 1 fails because Tom has an insufficient balance. However, Harry later sends, to each first node, TX 2 that Harry transfers 20 RMB to Tom. If first consensus verification and second consensus verification on TX 2 succeed and an asset balance of Tom becomes 25 RMB before each first node performs the first consensus verification on TX 1, the first consensus verification on TX 1 can succeed when each first node performs the first consensus verification on TX 1, and Tom does not need to resend TX 1 to each first node.

It is worthwhile to note that, in the architecture of the blockchain system shown in FIG. 1, when the first node performs first consensus verification on service data A, basic data that supports the first node in simulating execution of service data A can include both valid service data recorded in a blockchain and service data whose first consensus verification succeeds but second consensus verification is not completed (whether the second consensus verification succeeds is unknown). In the example shown in FIG. 4, if the first consensus verification on TX 2 succeeds and the second consensus verification on TX 2 is not completed before each first node performs the first consensus verification on TX 1, the first node can predict, based on TX 2, that the asset balance of Tom becomes 25 RMB, and determine that the first consensus verification on TX 1 succeeds when performing the first consensus verification on TX 1.

In addition, it is worthwhile to note that all service data in the service queue to be validated is usually arranged in sequence in step S304. The first node can sequentially perform the first consensus verification on each piece of service data in a specific sequence (usually a service data receiving sequence), and sequentially add each piece of service data whose first consensus verification succeeds to a queue tail of the service queue to be validated. In such case, the sequence of all the service data arranged in the service queue to be validated is consistent with a sequence in which the first node previously performs the first consensus verification on each piece of service data to be validated. Correspondingly, each second node can select several pieces of service data in a front-to-back order from the service queue to be validated, package the several pieces of service data into a block, and perform the second consensus verification on the block. Each second node stores the block in the blockchain if second consensus verification on all service data in the block succeeds.

Based on this, after step S312, that is, after the first node performs the first consensus verification on the service data to be retried, the first node can add service data to be retried whose first consensus verification succeeds to a location that is before a specified location in the service queue to be validated. The specified location can be specified based on a need, and can be a queue head of the service queue to be validated. In such case, if the first consensus verification performed on the service data to be retried succeeds, the service data to be retried can be added to a location that is relatively close to the queue head of the service queue to be validated, so that the second node can select the service data to be retried as soon as possible, and perform the second consensus verification.

It is worthwhile to further note that, in the example shown in FIG. 4, when performing the first consensus verification on TX 1, the first node can determine, based on TX 2 whose first consensus verification succeeds before, that the first consensus verification on TX 1 succeeds. However, if the later second consensus verification on TX 2 fails, there is no premise for validity of TX 1, and TX 1 should not be stored in the blockchain. Therefore, in the present implementation of the present specification, a specified rule is used, so that each second node packages TX 1 and TX 2 into one block, to resolve the problem. The service data to be retried whose first consensus verification succeeds can be added to a location close to service data that enables the first consensus verification on the service data to be retried to succeed in the service queue to be validated. For example, TX 1 whose performed first consensus verification succeeds can be added to a location after TX 2 in the service queue to be validated. As such, there is a maximum possibility that TX 1 and TX 2 can be packaged by each second node into one block.

Therefore, all service data (including TX 1) in the block is considered to be invalid if the second consensus verification on TX 2 fails.

In addition, the first node can add the service data to a queue tail of a precreated service queue to be retried as the service data to be retried in step S308. As such, a sequence of all service data arranged in the service queue to be retried is also consistent with a sequence in which the first node performs the first consensus verification on each piece of service data to be retried. In such case, in step S312, the first node can sequentially select at least one piece of service data to be retried from the service queue to be retried, and perform the first consensus verification on the selected service data to be retried.

Figure 5:
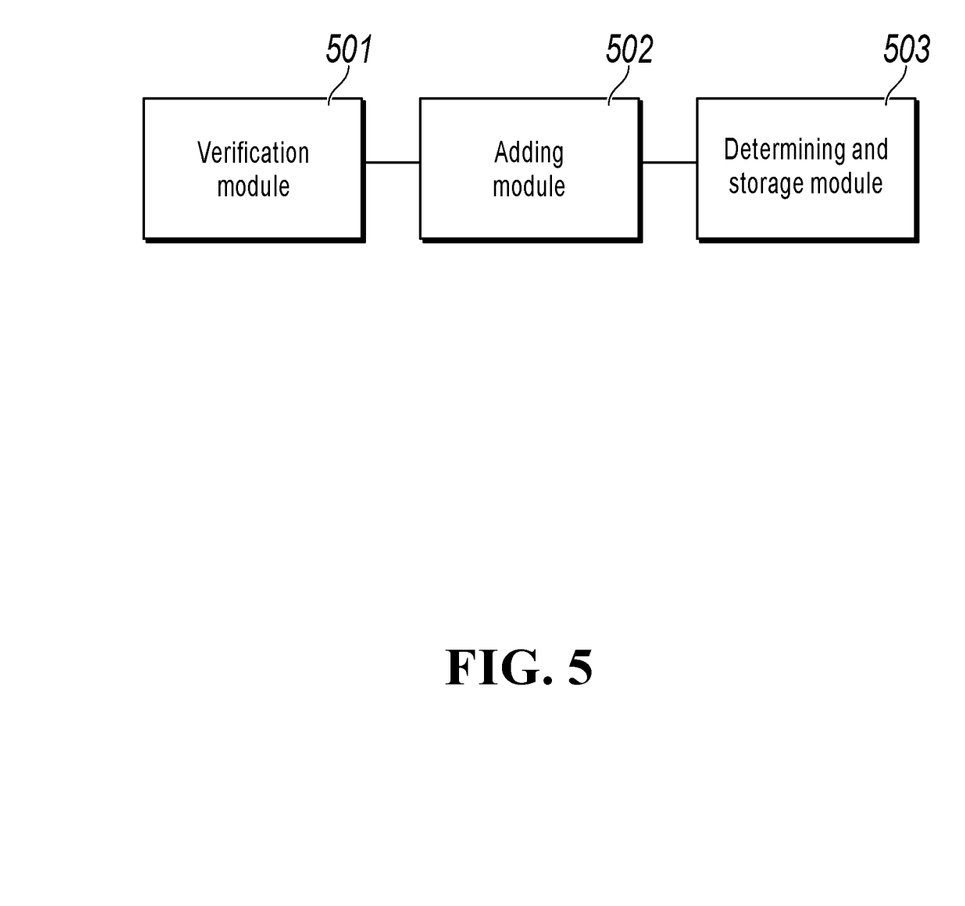
FIG. 5 is a schematic diagram illustrating a consensus verification apparatus, according to an implementation of the present specification.

Based on the consensus verification method shown in FIG. 1, an implementation of the present specification further correspondingly provides a consensus verification apparatus. As shown in FIG. 5, blockchain nodes include at least the apparatus and a second node. The apparatus is configured to perform first consensus verification, the second node is configured to perform second consensus verification, and the apparatus includes: a verification module 501, configured to receive service data, perform the first consensus verification on the service data, and perform the first consensus verification on service data to be retried when it is determined that a predetermined retry execution condition is triggered; an adding module 502, configured to add the service data to a service queue to be validated if the first consensus verification on the service data succeeds, so that each second node selects service data from the service queue to be validated to generate a block, and performs the second consensus verification on the block; and a determining and storage module 503, configured to: if the first consensus verification on the service data fails, determine whether the service data satisfies a predetermined retry condition, and if yes, store the service data as the service data to be retried.

The determining and storage module 503 is configured to determine, based on a reason why the first consensus verification on the service data fails, whether the service data satisfies the predetermined retry condition.

The service data includes service data of a transfer service.

The determining and storage module 503 is configured to: when an asset balance of a transferor is insufficient, determine that the service data satisfies the predetermined retry condition.

A maximum capacity of each block is predetermined, and/or the second node generates a period of each block.

The verification module 501 is configured to determine that the predetermined retry execution condition is triggered if a difference between the maximum capacity and a total data amount of service data selected by each second node from the service queue to be validated to generate a next block falls within a first specified value range; and/or determine that the predetermined retry execution condition is triggered if a time interval between a current moment and an end moment of a current period falls within a second specified value range.

The determining and storage module 503 is configured to add the service data to a queue tail of a precreated service queue to be retried as the service data to be retried.

The verification module 501 is configured to sequentially select, in a front-to-back order, at least one piece of service data to be retried from the service queue to be retried; and perform the first consensus verification on the selected service data to be retried.

The verification module 501 is configured to perform the first consensus verification on the service data to be retried, until the first consensus verification on the service data to be retried succeeds; or perform the first consensus verification on the service data to be retried, until the number of times of performing the first consensus verification on the service data to be retried reaches a specified value.

The adding module 502 is configured to add the service data to a queue tail of the service queue to be validated; each second node sequentially selects, in a front-to-back order, several pieces of service data from the service queue to be validated, to generate the block; and the adding module 502 is configured to: after the verification module performs the first consensus verification on the service data to be retried, add service data to be retried whose first consensus verification succeeds to a location that is before a specified location in the service queue to be validated.

Figure 6:
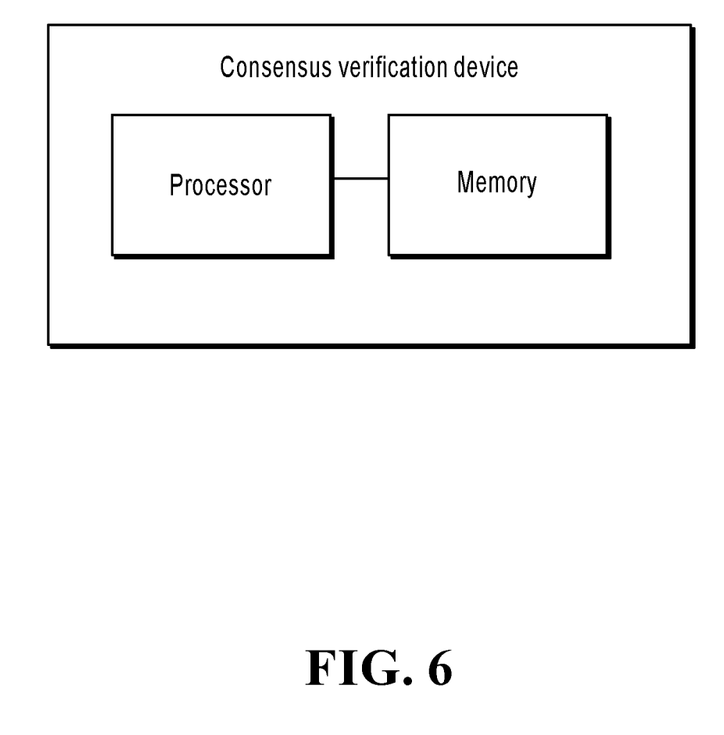
FIG. 6 is a schematic diagram illustrating a consensus verification device, according to an implementation of the present specification.

Based on the consensus verification method shown in FIG. 1, an implementation of the present specification further correspondingly provides a consensus verification device. As shown in FIG. 6, blockchain nodes include at least the device and a second node. The device is configured to perform first consensus verification, the second node is configured to perform second consensus verification, the device includes one or more processors and a memory, the memory stores a program, and the one or more processors are configured to perform the following steps: receiving service data, and performing the first consensus verification on the service data; adding the service data to a service queue to be validated if the first consensus verification on the service data succeeds, so that each second node selects service data from the service queue to be validated to generate a block, and performs the second consensus verification on the block; or if the first consensus verification on the service data fails, determining whether the service data satisfies a predetermined retry condition, and if yes, storing the service data as service data to be retried; and performing the first consensus verification on the service data to be retried when it is determined that a predetermined retry execution condition is triggered.

The implementations of the present specification are described in a progressive way. For same or similar parts of the implementations, references can be made to the implementations. Each implementation focuses on a difference from other implementations. Especially, the device shown in FIG. 6 is basically similar to the method implementation, and therefore is described briefly. For related parts, references can be made to some descriptions in the method implementation.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be easily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A memory controller can also be implemented as a part of a control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, the built-in microcontroller, etc. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a nonvolatile memory, and/or another form that are in the computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the description in the present specification, the computer readable medium does not include a transitory computer readable medium (transitory computer-readable medium), such as a modulated data signal and carrier.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in a distributed computing environment in which tasks are performed by remote processing devices that are connected through a communications network. In the distributed computing environment, the program module can be located in both local and remote computer storage media including storage devices.

The previous descriptions are implementations of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

Implementations of the present disclosure relate to a consensus verification. In particular, in some implementations, for each piece of service data, if first consensus verification on the service data fails, a first node determines whether the service data satisfies a predetermined retry condition as opposed to directly considering the service data to be invalid. If the predetermined retry condition is determined to be satisfied, then the solution can store the service data as service data to be retried. In such instances, the first node can perform the first consensus verification on the service data to be retried when determining that a predetermined retry execution condition is triggered, such as when a reason for previous failure is determined to no longer be present.

In providing the described solution, technical advantages are provided in the blockchain-related technologies, such that service data whose first consensus verification fails, but which satisfies a particular predetermined retry condition, the service data is not directly considered to be invalid, but becomes service data to be retried. Instead of losing the data initially used in the verification, time is given for the situation to change or for the verification to later succeed. In doing so, fewer attempts at service data submissions may be required, and service data submitted to the first node in a blockchain at a first time can be re-verified when a suitable situation or other re-verification trigger occurs. Such a solution is more convenient for users, reduces the amount of service data to be submitted to a particular blockchain to perform particular operations when the first consensus verification may fail, and can reduce network traffic, bandwidth usage, and unnecessary use of computing resources (such as, memory, processing cycles, and data storage).

Figure 7:
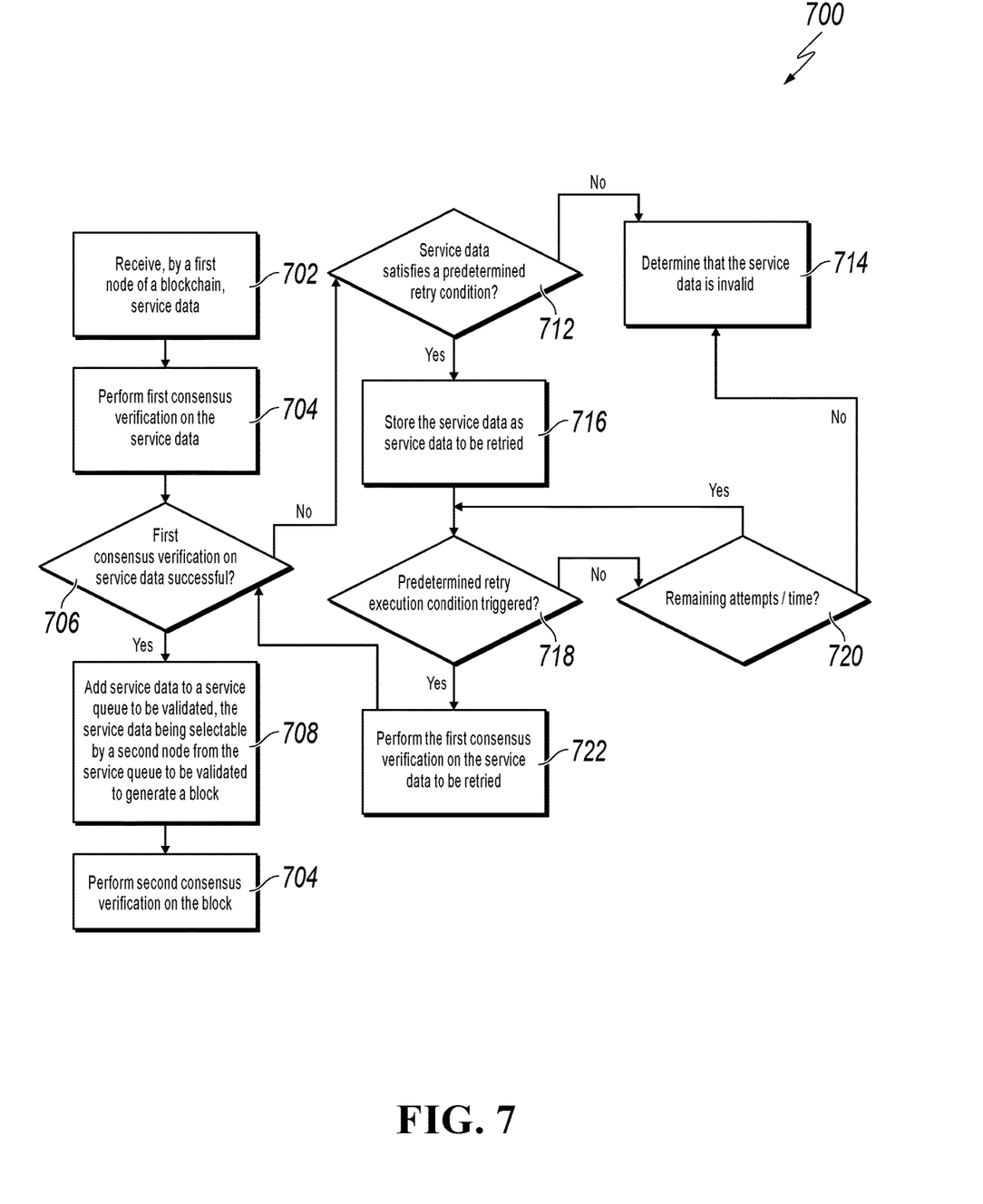
FIG. 7 is a flowchart illustrating an example of a computer-implemented method for performing a consensus verification method, according to an implementation of the present disclosure.

FIG. 7 is a flowchart illustrating an example of a computer-implemented method 700 for performing a consensus verification method, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 700, service data is received by a first node of a blockchain. The first node is configured to perform first consensus verification, and a second node in the blockchain can be configured to perform a second consensus verification. A blockchain node can serve as both a first node and a second node. From 702, method 700 proceeds to 704.

At 704, the first node can perform first consensus verification on the received service data. In some instances, the first node performs the first consensus verification on the service data after receiving the service data. From 704, method 700 proceeds to 706.

At 706, a determination is made as to whether the first consensus verification on the service data is successful, or that the verification succeeds. If it is determined that the first consensus verification succeeds, then method 700 proceeds to 708. If, however, it is determined that the first consensus verification fails, then method 700 proceeds to 712.

In the first instance, where verification succeeds, at 708 the service data is added to a service queue to be validated. A second node can select the service data from the service queue as service data to be validated, and can be validated to generate a block. From 708, method 700 proceeds to 710, where a second consensus verification can be performed on the block. After 710, method 700 can stop.

Returning to the second instance where the first consensus verification on the service data fails, method 700 continues at 712. At 712, a determination is made as to whether the service data which previously failed the first consensus verification satisfied a predetermined retry condition. If it is determined that the service data does satisfy the condition, method 700 proceeds to 716. If, however, it is determined that the service data does not satisfy the retry condition, then method 700 proceeds to 714.

In some instances, determining whether the service data satisfies the predetermined retry condition at 712 can include determining, based on a reason why the first consensus verification on the service data fails, whether the service data satisfies the predetermined retry condition. In instances where the service data is service data of a transfer service, the determination may include determining whether an asset balance of a transfer is insufficient. In response to determining that the asset balance is insufficient, it may be determined that the service data satisfies the predetermined retry condition. The service data may satisfy the predetermined retry condition as the asset balance may change over time, such that by retrying at a later time, then the asset balance of the transfer may eventually be sufficient. In general, the predetermined retry condition can be met or satisfied if the reason that the first consensus verification on the service data fails can be eliminated over time after the initial failure.

At 714, where it is determined that the service data does not satisfy a predetermined retry condition, a determination is made that the service data is invalid. In those instances, the reason for the failure of the service data may not be capable of being eliminated over time. After 714, method 700 can stop.

At 716, the service data satisfying the predetermined retry condition can be stored as service data to be retried. In one implementation, the first node can store, as service data to be retried, service data whose first consensus verification fails and that satisfies the predetermined retry condition. The first node can store the service data to be retried in the memory or another storage medium. From 716, method 700 continues to 718.

At 718, a determination is made as to whether a predetermined retry execution condition is triggered. If it is determined that such a condition is triggered, then method 700 proceeds to 722. If not, method 700 continues at 720.

At 720, a determination is made, after the retry execution condition is not triggered, whether any remaining attempts or time remains for a particular service data. In some instances, service data that has been stored to be retried may only be stored for a particular period of time, or after a number of first verification attempts have been made. If those amounts are exceeded, then method 700 can proceed to 714, where the service data is determined to be invalid, and the service data may be removed from the service data to be retried. If not, method 700 returns to 718 and continues to make a determination as to whether the retry execution condition has been triggered. In response to determination that the retry execution condition has been triggered, method 700 continues at 722. At 722, the first consensus verification can be performed on the service data to be retried.

In some instances, each of the first node and the second node of the blockchain may comprise a predetermined maximum capacity, and/or the second node can generate a period of each block.

To determine whether the predetermined retry execution condition is triggered can include, in some instances, determining whether a difference between the maximum capacity and a total data amount of the service data as selected by each second node from the service queue to be validated to generate a next block falls within a first specified value range. In response to determining that the difference falls within the first specified value range, the predetermined retry execution condition may be determined to be triggered.

Alternatively, or in addition, determining that the predetermined retry execution condition is triggered comprises determining whether a time interval between a current moment and an end moment of a current period falls within a second specified value range, and, in response to determining that the time interval falls within the second specified value range, the predetermined retry execution condition can be determined to be triggered.

Upon performing the first consensus verification on the service data to be retried at 722, method 700 can return to 706 to determine whether the first consensus verification is successful. Similar operations as those described herein can be performed.

In some instances, the stored service data to be retried may be stored by adding the service data to a queue tail of a precreated service queue to be retried as the service data to be retried. In those instances, performing the first consensus verification on the service data to be retried comprises sequentially selecting, in a front-to-back order, at least one piece of service data to be retried from the service queue to be retried. The first consensus verification is then performed on the selected service data to be retried.

Alternately, or in addition, performing the first consensus verification on the service data to be retried comprises performing the first consensus verification on the service data to be retried until the first consensus verification on the service data to be retried succeeds or until the number of times of performing the first consensus verification on the service data to be retried reaches a specified value.

In some instances, adding the service data to the service queue to be validated in 708 can include adding the service data to a queue tail of the service queue to be validated. In those instances, the second node selecting service data from the service queue to be validated to generate a block by performing operations can include sequentially selecting, by each second node, several pieces of service data in a front-to-back order from the service queue to be validated to generate the block. After the performing the first consensus verification on the service data to be retried, method 700 may further include adding service data to be retried whose first consensus verification succeeds to a location that is before a specified location in the service queue to be validate.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving, by a first node of a blockchain, service data;
    performing first consensus verification on the service data;
    in response to determining that the first consensus verification on the service data fails, determining that the service data satisfies a predetermined retry condition; and
    storing the service data as service data to be retried in response to determining that the service data satisfies the predetermined retry condition.

2. The computer-implemented method of claim 1, wherein determining that the service data satisfies the predetermined retry condition comprises:
    determining that an asset balance of a transfer is insufficient, wherein the service data comprises service data of a transfer service.

3. The computer-implemented method of claim 1, wherein a block of the blockchain comprises a predetermined maximum capacity.

4. The computer-implemented method of claim 3, comprising:
    determining that a difference between the predetermined maximum capacity and a total data amount of service data selected from a service queue to be validated to generate a next block falls within a first specified value range; and
    determining that a predetermined retry execution condition is satisfied in response to determining that the difference falls within the first specified value range.

5. The computer-implemented method of claim 1, comprising:
- determining that a time interval between a current moment and an end moment of a current period falls within a second specified value range; and
- determining that a predetermined retry execution condition is triggered in response to determining that the time interval falls within the second specified value range.

6. The computer-implemented method of claim 1, wherein storing the service data as service data to be retried comprises:
- adding the service data to a queue tail of a service queue to be retried as the service data to be retried.

7. The computer-implemented method of claim 6, comprising:
- sequentially selecting, in a front-to-back order, at least one piece of service data to be retried from the service queue to be retried; and
- performing the first consensus verification on the at least one piece of service data to be retried.

8. A non-transitory, computer-readable medium storing one or more instructions executable by a computer system to perform operations comprising:
- receiving, by a first node of a blockchain, service data;
- performing first consensus verification on the service data;
- in response to determining that the first consensus verification on the service data fails, determining that the service data satisfies a predetermined retry condition; and
- storing the service data as service data to be retried in response to determining that the service data satisfies the predetermined retry condition.

9. The non-transitory, computer-readable medium of claim 8, wherein determining that the service data satisfies the predetermined retry condition comprises:
- determining that an asset balance of a transfer is insufficient, wherein the service data comprises service data of a transfer service.

10. The non-transitory, computer-readable medium of claim 8, wherein a block of the blockchain comprises a predetermined maximum capacity.

11. The non-transitory, computer-readable medium of claim 10, comprising:
- determining that a difference between the predetermined maximum capacity and a total data amount of service data selected from a service queue to be validated to generate a next block falls within a first specified value range; and
- determining that a predetermined retry execution condition is satisfied in response to determining that the difference falls within the first specified value range.

12. The non-transitory, computer-readable medium of claim 8, comprising:
- determining that a time interval between a current moment and an end moment of a current period falls within a second specified value range; and
- determining that a predetermined retry execution condition is triggered in response to determining that the time interval falls within the second specified value range.

13. The non-transitory, computer-readable medium of claim 8, wherein storing the service data as service data to be retried comprises:
- adding the service data to a queue tail of a service queue to be retried as the service data to be retried.

14. The non-transitory, computer-readable medium of claim 13, comprising:
- sequentially selecting, in a front-to-back order, at least one piece of service data to be retried from the service queue to be retried; and
- performing the first consensus verification on the at least one piece of service data to be retried.

15. A computer-implemented system, comprising:
- receiving, by a first node of a blockchain, service data;
- performing first consensus verification on the service data;
- in response to determining that the first consensus verification on the service data fails, determining that the service data satisfies a predetermined retry condition; and
- storing the service data as service data to be retried in response to determining that the service data satisfies the predetermined retry condition.

16. The computer-implemented system of claim 15, wherein determining that the service data satisfies the predetermined retry condition comprises:
- determining that an asset balance of a transfer is insufficient, wherein the service data comprises service data of a transfer service.

17. The computer-implemented system of claim 15, wherein a block of the blockchain comprises a predetermined maximum capacity.

18. The computer-implemented system of claim 17, comprising:
- determining that a difference between the predetermined maximum capacity and a total data amount of service data selected from a service queue to be validated to generate a next block falls within a first specified value range; and
- determining that a predetermined retry execution condition is satisfied in response to determining that the difference falls within the first specified value range.

19. The computer-implemented system of claim 15, comprising:
- determining that a time interval between a current moment and an end moment of a current period falls within a second specified value range; and
- determining that a predetermined retry execution condition is triggered in response to determining that the time interval falls within the second specified value range.

20. The computer-implemented system of claim 15, wherein storing the service data as service data to be retried comprises:
- adding the service data to a queue tail of a service queue to be retried as the service data to be retried.

* * * * *